United States Patent [19]
Scott

[11] Patent Number: 4,776,197
[45] Date of Patent: Oct. 11, 1988

[54] PROCESS AND APPARATUS FOR PRODUCING AN ELECTRICAL BATTERY POLE OR TERMINAL

[75] Inventor: Giorgio Scott, Brescia, Italy

[73] Assignee: Aquila Piombo per Caccia e Tiro S.r.l., Cellatica, Italy

[21] Appl. No.: 56,383

[22] Filed: Jun. 1, 1987

[30] Foreign Application Priority Data

Sep. 23, 1986 [IT] Italy ............................. 21792 A/86

[51] Int. Cl.$^4$ ............................................. B21D 22/00
[52] U.S. Cl. ............................................. 72/353; 72/358
[58] Field of Search ................... 72/353, 354, 358, 352

[56] References Cited

U.S. PATENT DOCUMENTS

| | | | |
|---|---|---|---|
| 3,180,017 | 4/1965 | Simmons | 72/352 |
| 4,041,755 | 8/1977 | Rut | 72/353 |
| 4,406,146 | 9/1983 | Suzuki | 72/353 |

FOREIGN PATENT DOCUMENTS

| | | | |
|---|---|---|---|
| 774752 | 10/1980 | U.S.S.R. | 72/353 |
| 776731 | 11/1980 | U.S.S.R. | 72/353 |

Primary Examiner—W. Donald Bray
Attorney, Agent, or Firm—Bucknam and Archer

[57] ABSTRACT

An electrical battery pole or terminal (50) is cold-produced by means of a process comprising axial compression at room temperature of an essentially cylindrical metal element (42) between a first and a second portion of die (1) and (2), travelling one opposite to the other, of which the first (1) forms that part which will be the protruding part (13) of the battery pole or terminal and the second (2) portion of die, by subjecting the lower part of the metal block to compression, forms the electrical battery pole's lower part, which is provided with shaped portions (35) forming a number of ribs.

10 Claims, 3 Drawing Sheets

PROCESS AND APPARATUS FOR PRODUCING AN ELECTRICAL BATTERY POLE OR TERMINAL

This invention relates to a process for obtaining an electrical battery pole or terminal, the equipment to carry out such process as well as the electrical battery pole or terminal thus obtained.

It is known that in order to make an electrical battery pole or terminal, complex processes are usually employed which require a number of operations and involve comparatively long periods for the production of the pole.

One of the methods usually employed to produce an electrical battery pole or terminal is the so-called drop casting. This method allows to obtain an electrical battery pole, the initial shape and structure of which would satisfy the properties required in this battery element. However, this pole has the disadvantage that it has harmful blowholes which allow the battery acid to transude.

Another method to produce electrical battery poles is pressure casting. This, as it is known, essentially consists in causing material for production of the pole to melt by pressure in a pump-operated die.

The two methods discussed hereinabove produce electrical battery poles which besides the above-mentioned shortcomings present size inaccuracies which affect working tolerances unfavorably.

The latter disadvantage involves difficulties for the application of the pole or terminal to the battery cover by using present units for automatic feed of pole or terminal, which are applied to presses for injection/moulding of the very covers.

The summary discussed hereinabove demonstrates the shortcomings and disadvantages of the known processes which virtually also apply to the equipment used. The known processes in fact require a number of operations in a predetermined and immutable sequence, including first the melting of the metal employed, then the pole-making operation by drop or by pressure and last, cooling off which operation is to be carried out slowly, thus considerably lengthening the processing times.

In addition, the melting of the metal employed for the production of battery poles or terminals, necessarily involves accurate check of the equipment operating temperature so as not to damage metal molecular structure which should remain undamaged so as to allow satisfactory battery operation. This check is especially felt with respect to current conduction which takes up particularly intense values during motor start-up.

The processing mode of pole production also must be accurately checked, especially the final operation of cooling, which must necessarily be carried out gradually so as not to damage, also in this case, the structure of the pole as well as, for instance, not to cause the hardening of the metal which would weaken the pole structure, thus rendering it hardly suitable to withstand stresses or to be run through by intense currents.

The present invention provides a process for obtaining an electrical battery pole or terminal, such as allowing the elimination and solution of all the disadvantages mentioned hereinabove, both with respect to size accuracy, aesthetic appearance and structure of the pole obtained.

The present invention also provides the apparatus to carry out the process, as well as an electrical battery pole or terminal free of defects which offers constant reliability and which ensures satisfactory operation and long-life of battery.

The process for the production of an electrical battery pole or terminal according to this invention includes: (a) a preliminary cold moulding processing stage of an essentially cylindrical metal block which is pressed between a first and a second die; the first die keeps the block in a stable position, while the second die inserts the block into a cavity obtained in the first and the second die for forming a semi-finished product essentially corresponding to the finished pole, as the block part being inserted into the second die is subjected to a further expansion action, essentially parallel one to the other so that protruding outer ribs on the end of pole are formed; and (b) a second processing stage of blanking or milling of the ends of the semi-finished product taken out of dies, so as to form the finished battery pole. The apparatus, to carry out the process, consists of two dies of which the first die, moving vertically with respect to the second die, is provided with a cavity shaped to correspond to the configuration of the pole, the cavity being in its upper part closed by a moving punch; and the second, a stationary die, provided with a second moving punch which is inserted into the cavity of the first moving die. The second punch travels in a cavity formed in the second die, at the free end of which, corresponding to the shaped cavity, recesses are provided, for the formation of the ribs of the pole.

One of the main features of this invention is that the battery pole is formed by a "cold" process, the initial operation of metal melting is entirely omitted and the metal is then processed at room temperature. The result is that the possible final stage of cooling off is eliminated, thus considerably reducing operating times as compared to known processes and apparatus.

The electrical battery pole or terminal, formed by the process and apparatus, according to the present invention, is free of all the defects encountered with known poles or terminals, thus ensuring battery long-life and satisfactory operation. Therefore, this invention constitutes a remarkable improvement over known methods because it eliminates the disadvantage of insufficient compactness in structure of material of the pole, because it provides automatic feed of presses shaping the covers, and provides improved aesthetic appearance of the pole itself, which thus results in extremely higher quality as compared with the poles prepared by the known processes and apparatuses. The process of this invention is extremely simple and requires no checks, because it provides for the production of an electrical battery pole or terminal by means of two simple processing stages. The first stage consists of achieving what may be defined a semi-finished product, although it is practically already the almost-finished pole, and the second stage provides the finished pole by means of a simple blanking or milling. The two processing stages are carried out in the cold, that is at room temperature or at any rate with no heating or melting of the metal employed.

The apparatus, which is also one object of this invention, is extremely simple in its configuration and allows the achievement of the process, especially obtaining the "semi-finished product" by compression, with no special difficulty.

The electrical battery pole or terminal produced by the process and equipment of this invention, offers constant reliability and provides a pole of quality superior to the known poles.

The features and advantages of the process, apparatus and electrical battery pole or terminal of this invention, will more clearly appear from the detailed description hereinbelow and the attached figures which represent a form of an example, illustrative but not limitative construction of this invention of which;

Figure 1:
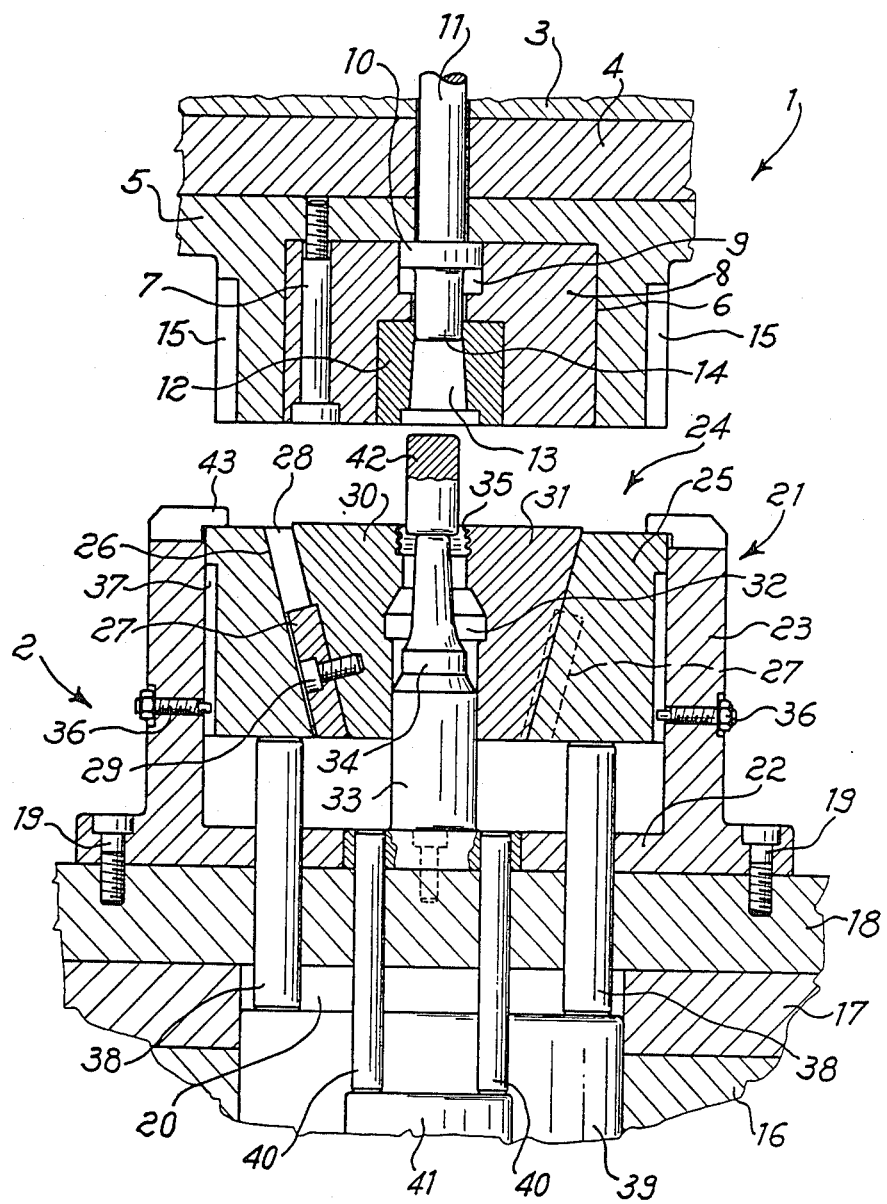
FIG. 1 is a schematic view in longitudinal section of the apparatus by the invention.
Figure 2:
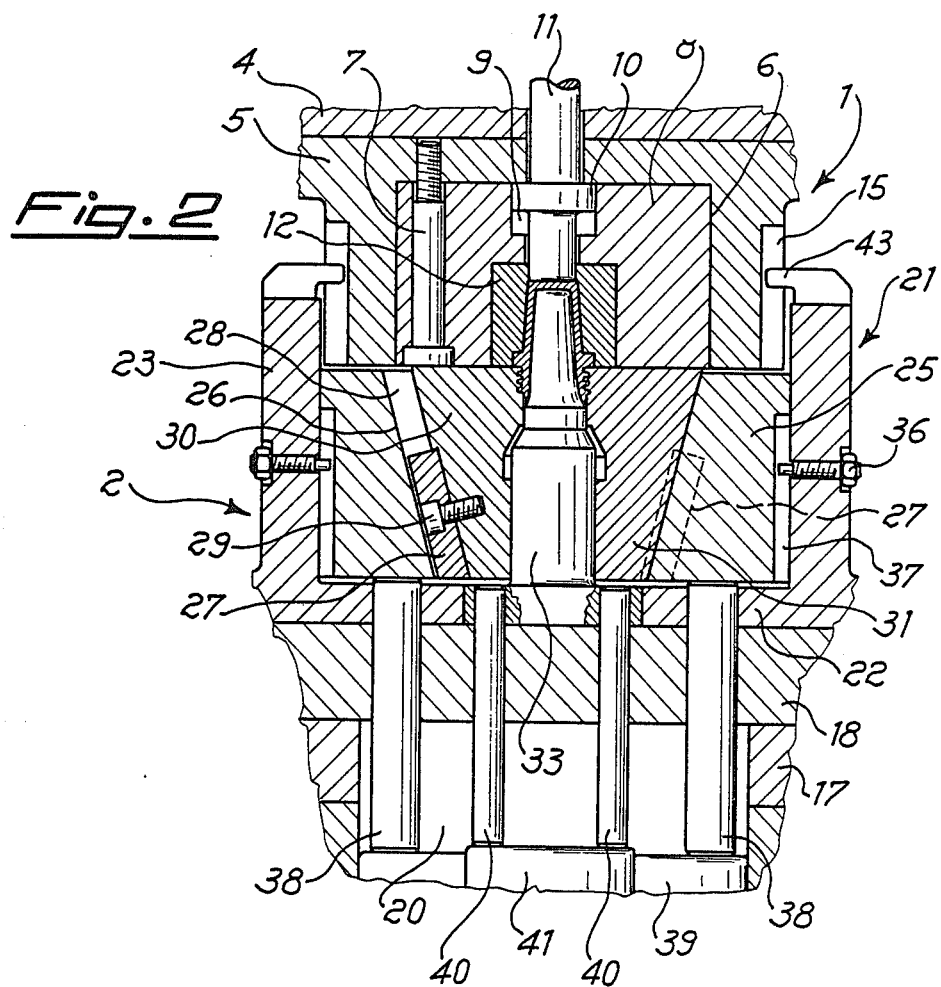
FIG. 2 is a view similar to FIG. 1 during moulding.
Figure 4:
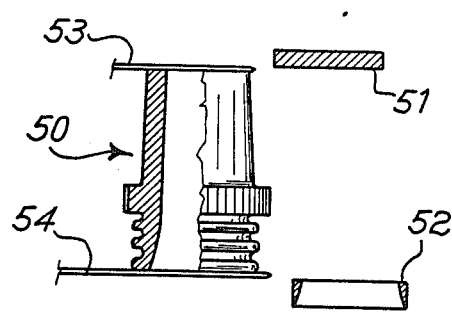
FIG. 4 is a schematic view illustrating the second stage of the process by the invention.
Figure 5:
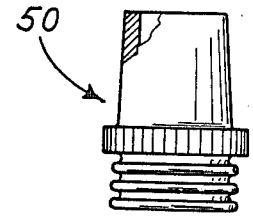
FIG. 5 is a schematic view of the electrical battery pole or terminal obtained by this invention, with a partial removal.
Figure 3:
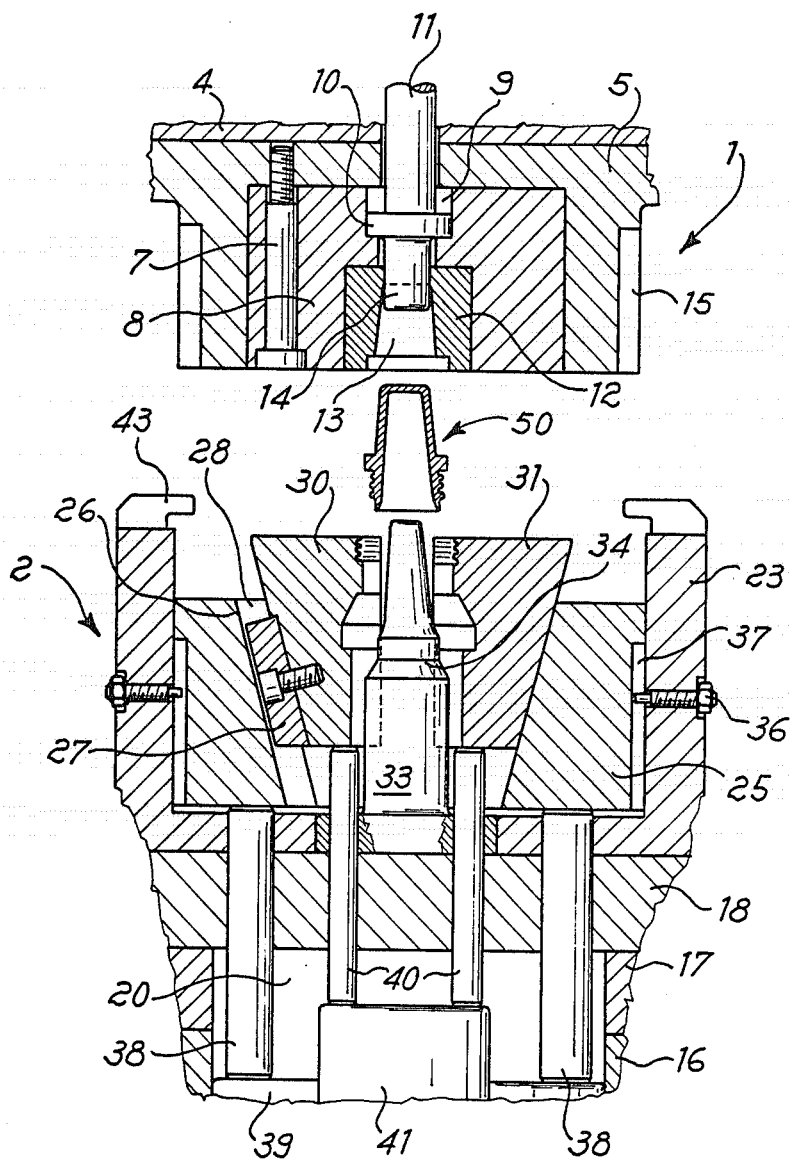
FIG. 3 is a view similar to FIGS. 1 and 2 while the semi-finished product is removed.

In the following description, FIGS. 1 through 3 are first referred to, and they describe an example of both the equipment and first stage of the process of this invention. FIGS. 4 and 5 describe the second stage of the process and the pole obtained.

With reference to FIGS. 1 through 3, the equipment, by the invention, for making the "semi-finished product" includes a moulding machine or station essentially consisting of two moulding dies 1 and 2.

The first moulding die 1 is supported by known means (not represented) allowing it to move vertically towards the second die 1 for moulding and to move away from the latter so as to allow the taking out of the semi-finished product obtained.

The second die 2, positioned below the first die 1, is essentially stationary and equipped with a moving portion described hereinbelow which allows removal of the semi-finished product from the moulding station.

The first die 1 essentially consists of a first crosspiece or upper crosspiece 3 which is fixed with a second crosspiece 4. The first crosspiece 3 is supported in a known way by supporting means (not represented), allowing it to move vertically downwardly, during the first stage of the process, and to move upwardly during the second stage of the process.

Another crosspiece 5 is fixed to the lower crosspiece 4 and is provided, in the lower part, with an essentially cylindrical cavity 6 within which a block 8 is fixed by means of a lock screw 7 running through the block and being screwed in crosspiece 5.

Block 8 presents, in its upper center part along the longitudinal axis, an essentially cylindrical cavity 9 within which a protruding ring 10 of a punch 11 travels. The punch 11 runs through corresponding apertures in crosspieces 3, 4 and 5. In the lower part of block 8 and coaxially to cavity 9, there is fixed, in known manner, in a corresponding cavity, a second block 12, which presents an essentially longitudinal cavity 13 coaxial to punch 11.

The cavity 13 is shaped so as to receive both the lower end 14 of punch 11, and to achieve the shaping of that part which will be the battery pole portion protruding from the cover of battery.

As shown in FIG. 1 especially, the longitudinal cavity 13 of the second block 12 is of the through-type from one end to the other of block 12 and in particular from the upper end, and the lower end of punch 14 is inserted into the block 12.

In the upper part, the shape of the longitudinal cavity 13 is essentially cylindrical and truncated-conical, with a downwardly increasing radius, and ending at the lower end with an essentially cylindrical portion of small thickness but of diameter larger than that of the upper part.

Further, on its contour and in particular on the contour of crosspiece 5, the first die 1 presents longitudinal grooves 15 which serve as guide for the downwards and upwards vertical travel, co-operating with the second die 2 and driving the first die 1 with respect to the second die 2.

The second die 2 presents supporting crosspieces of which the lower crosspieces are indicated with 16 and 17 and are made integral, in a known way, with the frame of the equipment.

To the second stationary crosspiece 17, a further stationary crosspiece 18 is fixed to which the upper part of the second die 2 is fixed by means of screws 19. The lower crosspieces 16 and 17 present an essentially cylindrical central cavity 20 within which the supporting and travel elements, hereinafter explained, are positioned and within which they can travel.

The second die 2 consists of an essentially cylindrical, internally hollow supporting body 21 which encloses and supports the die's moulding elements.

The supporting element 21 cavity consists of a lower wall or bottom 22, which is fixed, by means of screws 19, to the stationary crosspiece 18, and of a vertical, lateral cylindrical wall 23. Within this cavity, the operating elements of die 2 are positioned.

The operating elements of the die 2 include the forming means of one of the ends of the battery pole or terminal, which are indicated in the assembly by numeral 24. The forming means include first supporting means 25 of a second operating punch 33. The forming means are externally of an essentially cylindrical shape, which co-operates with the internal surface of lateral wall 23.

The first supporting means 25 define internally a cavity of increasing diameter towards first die 1. In particular, means 25 form internally a cavity of truncated-conical shape with the minor base arranged in the lower part corresponding to the bottom 22 and major base towards first die 1. On the internal wall 26 of the first supporting means 25, driving means 27 run consisting of an essentially parallelepipedal block, one side of which runs in a guide 28 on the internal wall 26 of the first supporting means 25, and the other side is fixed, by means of screw 29, to the second supporting means hereinbelow described, of the operating punch of the second die 2.

The second supporting means of the operating punch 33 of the second die 2 consist of an essentially truncated-conical body of cross section corresponding to the cavity delimited by the first supporting means 25.

The truncated-conical body consists of two portions 30, 31, each of which corresponds to one half of the essentially truncated-conical body.

To each half 30, 31, of the above truncated-conical body, driving blocks 27, by means of screws 29, are fixed; the blocks, by travelling along walls 26, enable each half 30, 31 to move upwardly and away one from the other or downwardly to approach one to the other.

The second supporting and driving means of the second operating punch 33 internally present, corresponding to their longitudinal axis and coaxially to cavity 13 of the first die 1, a shaped cavity 32, the form of which corresponds in its lower part to that of the second operating punch 33, while the upper part reproduces the outer battery pole or terminal shape.

As illustrated in particular in FIG. 1, the lower part of cavity 32, delimited by portions 30, 31 of the second supporting means, presents a form which from the top to the bottom, is essentially cylindrical, truncated-conical to become finally again cylindrical, which form corresponds to the shape of the corresponding portion 34 of operating punch 33.

On the upper section of cavity 32, each portion 30, 31 presents recesses 35, essentially parallel one to the other and defining essentially circular grooves of semi-circular cross section by means of which the lower part of battery pole or terminal according to the invention is manufactured. The pole or terminal correspondingly presents outer protruding ribs, also in cross section essentially of semi-circular section and parallel one to the other.

The first supporting means 25 of the operating punch 33 are provided with guides constituted by screws 36 screwed on vertical wall 23 of the supporting wall 22, internally protruding from the wall 23. The end of the screws 36 is inserted into an outer longitudinal cavity 37 on the outer wall of the first supporting means 25 of the operating punch 33.

Thus, the first supporting means 25 of the operating punch 33 are capable of travelling vertically upwardly and downwardly without their rotating around the longitudinal axis of the punch.

In the same way, due to the driving blocks 27 travelling into grooves 28 of the first supporting means 25, they allow vertical upwardly and downwardly travel of the operating punch's 33 second supporting and driving means without being rotated. Besides, the second moulding die 2 is provided with two supporting cylinders 38 of pre-fixed height, which at one end engage with the first supporting and driving means 25 of the operating punch 33, and, at the other, rest, in a known way and not represented in the figure, on a travelling, supporting and driving crosspiece 39, within a cavity delimited by lower crosspieces 16 and 17.

Two second cylinders 40, also of pre-fixed height, engage at their lower end with a vertically travelling block 41 which is actuated by known means, such as for instance punch means, and, at their upper end, cross horizontal supporting wall 22 and engage with second supporting and driving means 30, 31 of operating punch 33.

The equipment for the production of the semi-finished product operates as follows: A metal cylinder 42, of lead, for instance, constitutes the starting piece for making the pole of this invention.

Block 42 is initially positioned on top of operating punch 33 through an upper aperture of means 30, 31 whereas supporting and driving means 25, 30, 31 of the operating punch 33 are located, as represented in FIG. 1, in raised position. In such position, the first supporting and driving means 25 are faceplated to a projection 43 on wall 25, which constitutes the end of travel to the upwards feed of the first means 25. Once the metal block 42 has been thus pre-set, first die 1 is lowered, pushing the supporting and driving means 25, 30, 31 on to supporting wall 22. Operating punch 33 pushes metal block 42 into cavity 13 of first die.

Metal block 42 is thus subjected to compression according to an essentially axial direction, in which one of its portions is shaped correspondingly to that part which shall be the outer part of the battery pole or terminal, whereas the other end, in particular the end which becomes the lower one, is simultaneously subjected to radial expansion and compression. Specifically, the shaping of the battery pole is carried out by axial compression in the top part, the diameter of the metal block 42 being equal to the diameter of the lower end 14 of punch 11 and by axial compression and radial expansion of the metal block in the other parts which have higher diameters. Besides, moulding dies 1, 2, to which also punches 11 and 33 are related, simultaneously co-operate in these compression and compression-expansion actions.

In particular, punch 33 is inserted for almost the totality of the height of block 42, as shown in FIG. 2 in particular, and co-operates simultaneously with first and second die 1, 2. During this processing stage of process, first punch 11 exerts only an action opposite to that operated by second punch 33 since, as shown in FIGS. 1 and 2, the operating position of first punch 11 is stationary as its protruding ring 10 remains constantly in contact with the upper crosspiece 5.

During this first processing stage above-described, the so-called "semi-finished product" is obtained, which essentially consists of the virtually complete battery pole, but which is finished during the next stage by removal of two of its end areas.

FIG. 3 shows the extraction of the battery pole 50 from the moulding station.

During this processing stage, the two dies 1, 2 are moved away one from the other and, once the predetermined distance between them has been reached, the first operating punch 11 is lowered by known means, as illustrated in FIG. 3, so as to cause pole 50 to come out of first die 1, whereas, simultaneously, second supporting and driving means 30, 31 are raised from pistons 40 thus causing cavity 32 to open for the complete outcoming of pole 50 from dies 1, 2.

Since, as above stated, contrary to known processes, the process is carried out in the cold, no waiting time is necessary, and pole 50 can be directly brought to end station. As illustrated in FIG. 4, in this station, its end areas 51 and 52 are removed by means of a single blanking or milling, by known cutting means 53, 54, which are actuated in a known way and not illustrated in the figure. Battery pole 50 in its final shape as represented in FIG. 5 is thus obtained. The above description clearly shows the advantages offered by process and apparatus by this invention, as the battery pole 50 obtained is free of the disadvantages of conventional poles, as are process and equipment by this invention.

Finally, it is clear that changes and/or modifications may be made in the process and apparatus of this invention, without such causing it to fall outside with its protective scope.

I claim:

1. An apparatus for making an electrical battery pole or terminal (50) which comprises a first operating die (1) moving vertically upwardly and downwardly and provided with a cavity (13) shaped according to the configuration of said pole or terminal (50), first drive punch (11) operating with one end (14) in said cavity (13); a second stationary die (2) positioned under said first die provided with a second operating punch (33) moving vertically through said die and with a cavity (32) coaxial to cavity (13) of first die (1), in lower part thereof being shaped according to said punch (33), and in upper part thereof being shaped in accordance with the shape of the lower part of pole (50).

2. The apparatus according to claim 1 wherein said second operating die (2) includes a stationary hollow body (22, 23) and moving means for molding said pole (50), said moving means being positioned within said stationary body (22, 23); said moving means comprising:

first supporting and driving means (25) of said second operating punch (33), having externally a cylindrical shape co-operating with the vertical walls (23) of said stationary body, and internally, a cavity of truncated-conical section, the major base thereof being turned upwardly towards said first die (1);

second supporting and driving means (30) and (31) of said second operating punch (33) being made of a truncated-conical body of cross section corresponding to the cross section of the cavity delimited by said first supporting means (25) and having internally, along the longitudinal axis thereof and coaxially to said cavity (13) of said first die (1), a cavity (32), the shape thereof corresponding in the lower part, to the shape of said second operating punch (33) and, in the upper part thereof corresponding to the shape of the end part of said pole (50); said truncated-conical body (30, 31) moving along walls (26) of said truncated-conical cavity of said first supporting and driving means (25);

first supporting cylinders (38) of said first driving means (25) vertically moving by means of positon (39), and second supporting cylinders (40) of said second driving means (30) and (31), vertically moving by means of a piston (41).

3. The apparatus according to claim 2 wherein said first die (1) includes:

a crosspiece (5) having internally a cylindrical cavity (6) fixed to vertically travelling crosspieces (3) and (4);

a block (8) fixed inside a cavity (6) and provided with a cavity (9) in the upper central part thereof, along the longitudinal axis thereof;

a second block (12) fixed in the lower cavity of said block (8) and provided with a cavity (13), coaxial with said cavity (9) and of truncated-conical shape corresponding to that of pole (50); and said first punch (11) having the lower end (14) thereof inserted into said cavity (13) and provided with a protruding ring (10) positioned in said cavity (9).

4. The apparatus according to claim 3 wherein said first supporting menas (25) are provided with longitudinal external cavities (37) and vertical walls (23) with through-type screws (36), the end thereof being inserted into each external cavity (37).

5. The apparatus according to claim 4 wherein said first supporting means (25) have internal walls and are provided with grooves (28) and driving blocks running in said grooves (28) are fixed to said second supporting means (30) and (31).

6. The apparatus according to claim 5 wherein said cavity (32), formed within said second supporting means (30) and (31) has from the proximate end to the far end with respect to said first die (1), respectively, a cylindrical, truncated-conical and cylindrical shape, corresponding to the middle portion (34) of said punch (33), and, in the upper part thereof nearer to said first die (1), recesses (35) essentially parallel one to the other and defining circular grooves of semi-circular cross section.

7. The apparatus according to claim 6 wherein said second punch (33) is fixed to bottom (22) of said hollow stationary body.

8. A process for making an electrical battery pole or terminal by formation of a semi-finished product and subsequent blanking of ends, which consists of molding an essentially cylindrical, metal block (42) and compressing said block between a first die (1) and a second die (2), said first die co-operating with an operating punch (11), keeping the block (42) in a stable position, said second die cooperating with a second operating punch (33), inserting the block (42) into a cavity (13 and 35) formed between the first and the second die (1, 2) and of shape of the semi-finished product desired; subjecting the part of block (42) inserted into cavity (35) of second die (2), to an expansion action whereby outer, protruding ribs, essentially parallel one to the other on said end of said pole are obtained.

9. The process according to claim 8 wherein said block (42) is inserted into the cavity (13) of said first die (1), simultaneously the other end of said block (42) is inserted into said cavity (35) of said second die (2) and the end portion of said block (42) is expanded into said cavity (35) by said second operating punch (33).

10. The process according to claim 9 wherein the semi-finished product (50) is immediately subjected to blanking or milling to the ends (51) and (52) thereof.

* * * * *